United States Patent
Bappu et al.

(10) Patent No.: US 9,215,424 B2
(45) Date of Patent: Dec. 15, 2015

(54) CONTENT DELIVERY

(75) Inventors: Benjamin Bappu, Ipswich (GB); Hui Mj Tay, Ipswich (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 850 days.

(21) Appl. No.: 12/594,282

(22) PCT Filed: Feb. 27, 2008

(86) PCT No.: PCT/GB2008/000650
§ 371 (c)(1),
(2), (4) Date: Oct. 1, 2009

(87) PCT Pub. No.: WO2008/119925
PCT Pub. Date: Oct. 9, 2008

(65) Prior Publication Data
US 2010/0111059 A1     May 6, 2010

(30) Foreign Application Priority Data
Apr. 2, 2007 (EP) .................................. 07251471

(51) Int. Cl.
*H04W 4/00* (2009.01)
*H04N 7/173* (2011.01)
*H04N 21/433* (2011.01)
*H04N 21/436* (2011.01)
(Continued)

(52) U.S. Cl.
CPC ........ *H04N 7/17318* (2013.01); *H04L 67/2842* (2013.01); *H04N 21/4331* (2013.01); *H04N 21/43615* (2013.01); *H04N 21/47202* (2013.01); *H04N 21/6125* (2013.01); *H04N 21/632* (2013.01)

(58) Field of Classification Search
USPC ........................................... 370/338
See application file for complete search history.

(56) References Cited

U.S. PATENT DOCUMENTS

2002/0049717 A1* 4/2002 Routtenberg et al. ............. 707/1
2003/0033357 A1* 2/2003 Tran et al. ..................... 709/203
(Continued)

FOREIGN PATENT DOCUMENTS

| WO | WO 99/48003 | 9/1999 |
|---|---|---|
| WO | WO 2005/048011 | 5/2005 |
| WO | WO 2006/115720 | 11/2006 |

OTHER PUBLICATIONS

International Search Report for PCT/GB2008/000650 mailed Sep. 10, 2008.
(Continued)

*Primary Examiner* — Sulaiman Nooristany
(74) *Attorney, Agent, or Firm* — Nixon & Vanderhye PC

(57) ABSTRACT

Wireless routers having an ADSL or cable connection to content data available via the Internet, a wired connection for connecting local clients in a LAN and a wireless controller for connecting to other wireless routers and clients in a wireless local area networks (WLANs). The WLANs often intersect and therefore it is possible to communicate between wireless routers in order to exchange content data via the wireless LAN in addition to the ADSL or cable connection. Further, each wireless routers has a cache data store to cache content data requested by the user, or any other information sent to the wireless router from another wireless router. A central server can schedule transfer of content data between wireless routers by considering information packets stored on the server

22 Claims, 11 Drawing Sheets

(51) Int. Cl.
*H04N 21/472* (2011.01)
*H04N 21/61* (2011.01)
*H04N 21/63* (2011.01)
*H04L 29/08* (2006.01)

(56) References Cited

U.S. PATENT DOCUMENTS

| | | | |
|---|---|---|---|
| 2003/0120817 A1 | 6/2003 | Ott et al. | |
| 2004/0192342 A1* | 9/2004 | Ranganathan | 455/456.1 |
| 2005/0122946 A1* | 6/2005 | Won | 370/338 |
| 2005/0128995 A1 | 6/2005 | Ott et al. | |
| 2005/0132049 A1 | 6/2005 | Inoue et al. | |
| 2006/0062192 A1* | 3/2006 | Payne, III | 370/338 |

OTHER PUBLICATIONS

Min-You, "Wi-Fi community area networks enable a connected community", *Proceedings of the IEEE Circuits and Systems Symposium on Emerging Technologies*, vol. 2, 2004, pp. 671-674, XP010715481.

Li et al., "Summary cache: a scalable wide-area Web cache sharing protocol", *IEEE/ACM Transactions on Networking IEEE*, vol. 8, No. 3, Jun. 2000, pp. 281-293, XP011038860.

Leonardo, "Investigating the Performance of Video-on-Demand Systems over WLANs Using Generic Association Control", *Technical Report ES-677/05, COPPE/UFRJ Systems Engineering Program*, [Online], May 2005, XP002455542.

Das et al., "Cooperative cache-based data access in ad hoc networks", *Computer, IEEE Service Center*, vol. 37, No. 2, Feb. 2004, pp. 32-39, XP011107127.

Hideki et al., "A Replica Allocation Method Adapting to Topology Changes in Ad Hoc Networks", *Database and Expert Systems Applications Lecture Notes in Computer Science*, vol. 3588, 2005, pp. 868-878, XP019017645.

* cited by examiner

| ID | 1 hop neighbours | 2 hop neighbours |
|---|---|---|
| A | B | D |
|   | C | E |
|   | F |   |
| B | A | C |
|   |   | F |
| C | A | B |
|   | D |   |
|   | E |   |
|   | F |   |
| D | C | A |
|   | E | F |
| E | C | A |
|   | D |   |
|   | F |   |
| F | A | B |
|   | C | D |
|   | E |   |

Fig. 11

CONTENT DELIVERY

This application is the U.S. national phase of International Application No. PCT/GB2008/000650 filed 27 Feb. 2008 which designated the U.S. and claims priority to European Patent Application No. 07251471.4 filed 2 Apr. 2007, the entire contents of each of which are hereby incorporated by reference.

FIELD OF THE INVENTION

The present invention relates to data transfer and in particular to the delivery of data such as video-on-demand content from a content provider to a plurality of users.

BACKGROUND TO THE INVENTION

"Broadband" Internet connections currently provide users with download speeds of several Megabits per second. For example, at present Asymmetric Digital Subscriber Line (ADSL) connections can provide end users with download speeds ranging from 2 Mb/s to 8 Mb/s and in some areas, ADSL-2 provides users with download speeds of up to 24 Mb/s.

To take advantage of such improvements in download speed, users now expect higher visual and/or audio quality content such as movies, live broadcasts or audio to be available. However, the resulting file sizes of such content are often so large that the improvements in download speed may be cancelled out. For example, a 2 hour long "High Definition" movie is typically around 9 GB in size which would take over 3 hours to download over an 8 Mbs ADSL connection.

Furthermore, such a high volume of data transfer places a burden on the service providers of ADSL connections. To prevent their networks being saturated due to high data transfer, Internet Service Providers (ISPs) of broadband internet connections have started to implement data transfer limits or "caps" on user accounts. Therefore whilst users are no longer constrained by the data transfer speed, they are now constrained by the amount of data that they may transfer.

The present invention addresses these problems.

SUMMARY OF THE INVENTION

In addressing the above problems, the applicant has recognised that broadband users often use routers to link several home computers using Ethernet protocols into local area networks (LANs) all sharing a single ADSL connection. Furthermore, to accommodate mobility requirements, these routers also include wireless capabilities such as those provided by the 802.11a/b/g protocols to form Wireless Local Area Networks (WLANs) and will be referred to as wireless routers.

The 802.11 standards are based on radio transmissions and therefore the area serviced by a WLAN is an approximate sphere having a range of several meters around the location of a wireless router depending on the power of the transmission and nature of physical objects surrounding the wireless router. In many areas, such as a street or apartment block, many WLANs will intersect each other.

According to a first aspect, the present invention provides a method of delivering content data available from a remote content provider to a first wireless router having a wireless network that intersects the wireless network of at least one other neighbouring wireless router, the method comprising the step of: transferring the content data via the wireless network of the at least one other wireless router.

According to a second aspect, the present invention provides a wireless router comprising: wireless communication means for exchanging data via at least one wireless network; a data store for caching data to be delivered to a user connected to the wireless router; and controller means for monitoring and controlling the type of data to be stored in said data store.

According to a third aspect, the present invention provides an apparatus for scheduling data transfer between a plurality of wireless routers, the apparatus comprising: means for receiving from each wireless router: (i) neighbouring network information; (ii) cache content information; (iii) content requests; processing means for determining connection paths between the plurality of wireless routers using the received network information messages; and scheduling means for scheduling transfer of cache content between wireless routers in response to the received content requests.

Preferable features are set out in the dependent claims.

DESCRIPTION OF THE DRAWINGS

The present invention will now be described in detail along with the accompanying drawings in which:

FIG. 11 schematically shows the structure of a topology table created by the central server illustrated in FIG. 9.

DESCRIPTION OF THE PREFERRED EMBODIMENTS

In the embodiments, wireless router can exchange data with neighbouring wireless routers so that video-on-demand content requested by a user is preferentially obtained from either the wireless router's own cache or a neighbouring wireless router's cache instead of obtaining the content via the wireless router's ADSL connection. Each wireless router contains processing logic to handle the cache so that functioning of the cache is transparent to the user. By obtaining content via a neighbouring WLAN, the user obtains content without affecting their download limit and the ISPs core network benefits from a reduction in traffic usage.

Figure 1:
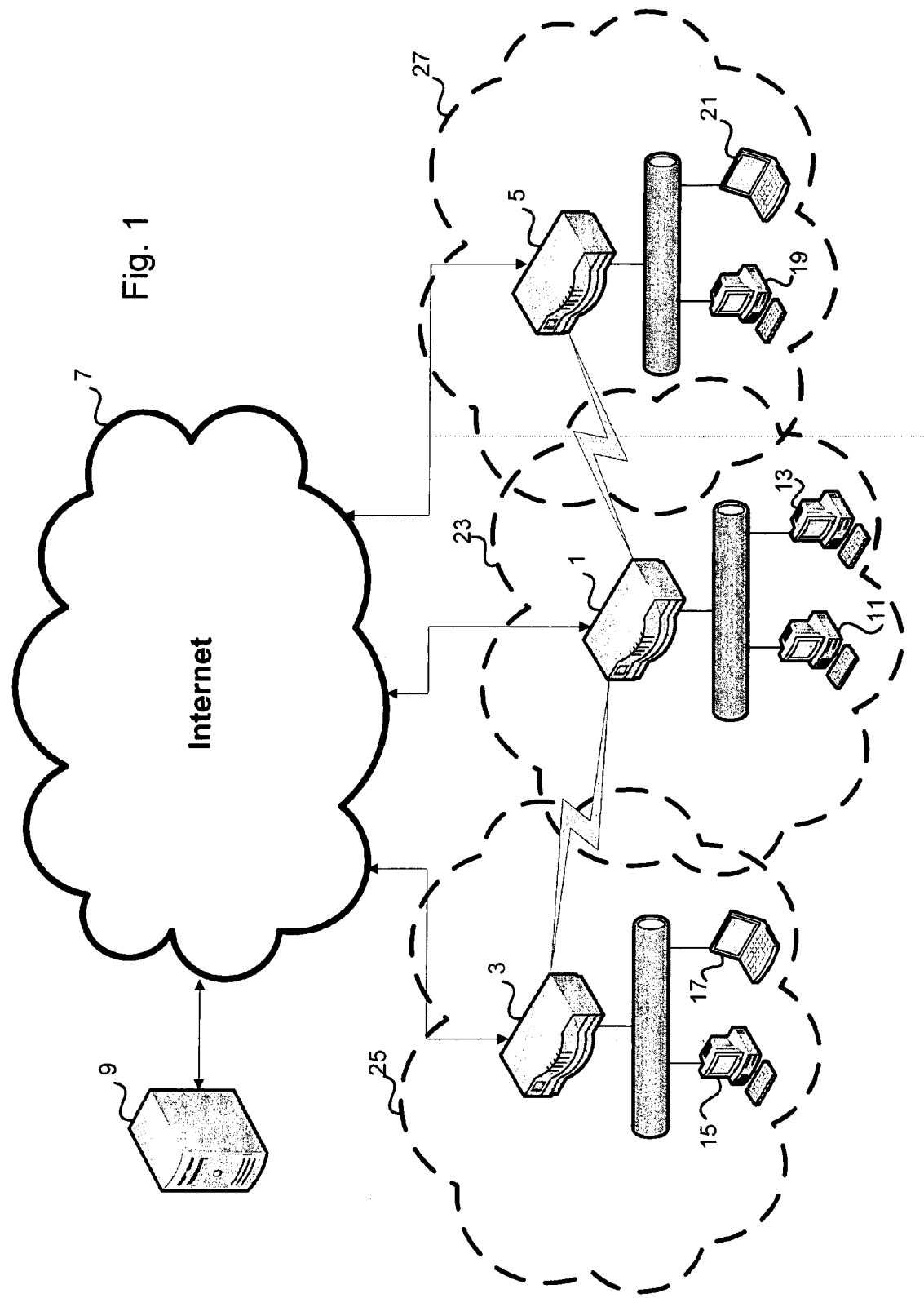
FIG. 1 shows a typical system according to the first embodiment.

FIG. 1 shows an overview of the main parts of a system according the first embodiment. In FIG. 1, three wireless routers 1, 3, 5, are each connected via a respective ADSL link to the Internet 7. A content provider 9 of video-on-demand services and content is also connected to the Internet 7. In this embodiment, each wireless router is physically located in a different user's house. For example, a first wireless router 1 is located at 81 Newgate Street, a second wireless router 3 is located at 79 Newgate Street and a third wireless router 5 is located at 83 Newgate Street.

In the system shown in FIG. 1, each wireless router 1, 3, and 5 provides a user's client machines within each respective house with access to each other and to services provided via the Internet 7. In FIG. 1, the first wireless router 1 maintains a LAN having two desktop computers 11, 13, the second wireless router 3 maintains a LAN having a desktop computer 15 and a notebook computer 17 and the third wireless router 5 also serves a desktop computer 15 and a notebook computer 17.

Each wireless router also provides wireless communication capabilities although for ease of explanation no wireless client machines are connected to any of the wireless routers shown in FIG. 1. Each wireless router provides an 802.11g WLAN having a maximum bandwidth of 54 Mbs. In FIG. 1, the WLAN of the first wireless router 1 is shown as a first cloud 25, the WLAN of the second wireless router 3 is shown as a second cloud 27 and the WLAN of the third wireless router 27 is shown as a third cloud 29.

Since the WLANs of each wireless router 1, 3, 5 extend for several meters in all directions the WLAN 23 of the first wireless router 1 intersects both the WLAN 25 of the second wireless router 3 and the WLAN 27 of the third wireless router. The second wireless router 3 is far away enough from the third hub 5 so their respective wireless networks 25 and 27 do not overlap.

Generally it is undesirable for WLANs to intersect because more than one WLAN operating on the same or similar channels causes interference leading to decreased network performance. However, in the first embodiment, when WLANs intersect the wireless routers can communicate because one of the wireless routers disables its own WLAN, performs wireless discovery to determine if there are any neighbouring WLANs of other wireless routers and becomes a client of the discovered wireless routers. As shown in FIG. 1, the first wireless router 1 can communicate directly with both the second wireless router 3 and the third wireless router 5, although not at the same time. The second wireless router 3 can communicate with the first wireless router 1 but not the third wireless router 5 because their WLANs do not intersect, and the third wireless router 5 can communicate with the first wireless router 1 but not the second wireless router 3.

The functionality of the first wireless router 1 will now be described with reference to FIG. 2. The second and third wireless routers 3 and 5 are functionally identical to the first wireless router 1.

Figure 2:
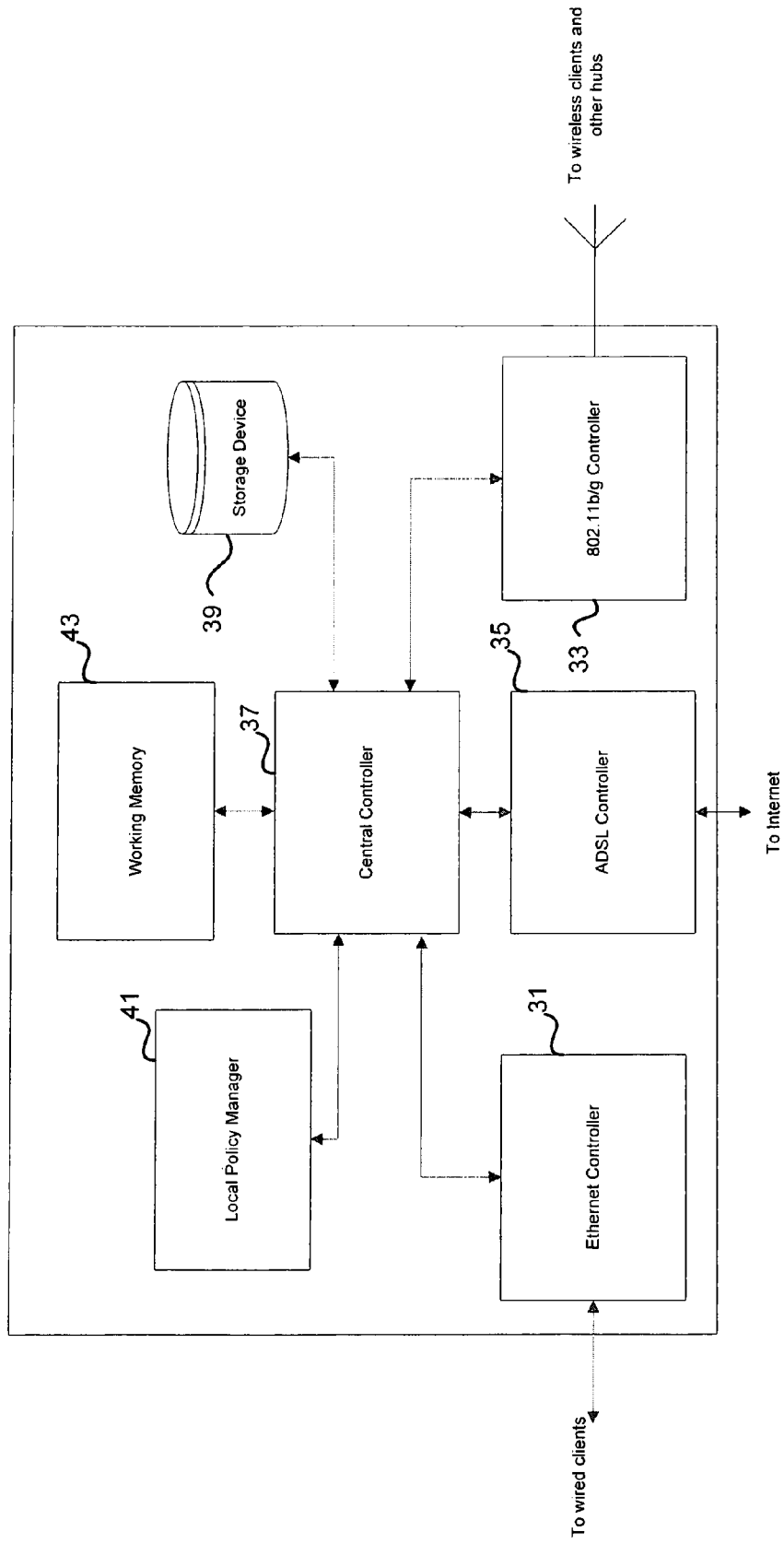
FIG. 2 schematically shows the functional components of a wireless router illustrated in FIG. 1.

FIG. 2 schematically shows the functional components of the first wireless router 1 illustrated in FIG. 1. As is conventional, the first wireless router has an Ethernet controller 31 for bi-directional communication with computers 11 and 13 on the LAN and an 802.11b/g wireless controller 33 for wireless bi-direction communication with the second and third wireless routers 3 and 5. The first wireless router 1 has an ADSL controller 35 for bi-direction communication with remote computers on the Internet such as content provider 9 shown in FIG. 1. A central controller 37 is responsible for the overall operation of the wireless router including control and coordination between the Ethernet controller 31, the wireless controller 33 and the ADSL controller 35.

The first wireless router 1 additionally includes a cache storage device 39 functioning as a cache for storing video-on-demand content' such as high definition movies. In this embodiment the storage device 39 is a 2.5" hard drive having a capacity of 20 GB. A local policy manager 41 controls the content of storage device 39 using information stored in the working memory 43. The local policy manager 41 also services any requests from its clients for video-on-demand content. If the requested content is already stored on the storage device 41, the local policy manager 41 causes the requested content to be transferred from the storage device 39 instead of allowing the request to be sent via the ADSL controller to the Internet.

Figure 3:
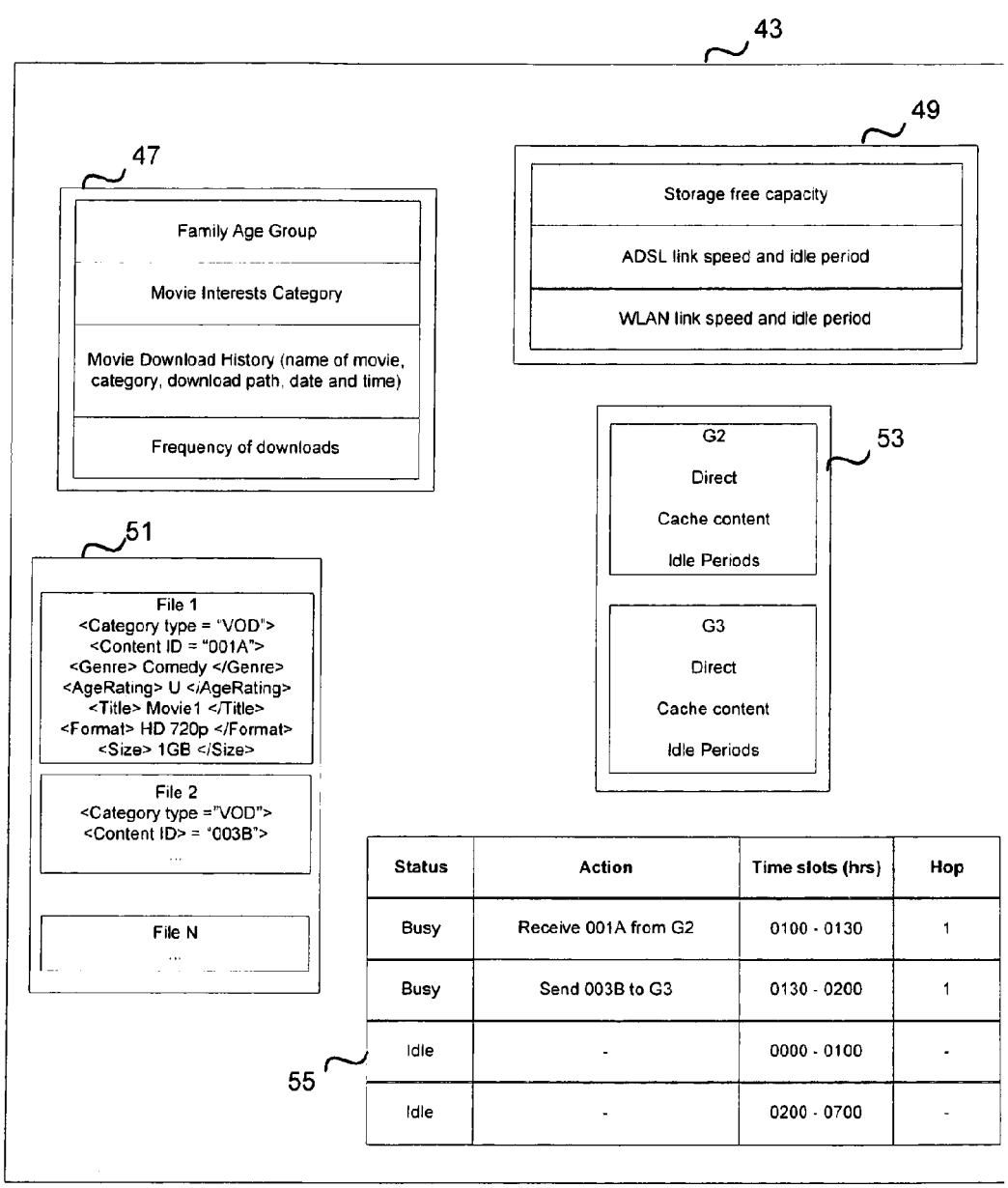
FIG. 3 schematically shows the contents of a working memory of the wireless router illustrated in FIG. 2.

FIG. 3 schematically shows the structure of the working memory 43 accessed by the Local Policy Manager 41. As mentioned above, the local policy manager 41 uses this information stored in the working memory 43 to control the contents of the storage device 39. The working memory contains:
- a user information store 47;
- a router information store 49;
- a cache directory 51;
- a neighbour network store 53; and
- a schedule 55.

The user information store 47 contains information relating to the preferences and download history for users connected to the LAN. The first wireless router 1 contains information relating to the users of the two desktop computers 11 and 13. In this embodiment, the user information store 47 contains the family age group, movie interests, previous content download history and the frequency of video-on-demand downloads.

The router information store 49 contains information regarding the amount of unallocated space in the storage device 39, the maximum link speed of the WLAN (in this embodiment a maximum of 54 Mb/s), and the maximum link speed of the wireless router's ADSL connection to the Internet. The router information store 49 also contains information regarding the pre-defined idle periods of each link.

The cache directory 51 stores a list of the files currently stored on the storage device 39. In addition, for each file in the cache, the cache directory also stores information regarding the category type, a unique ID number, the genre, age rating, title, format and size of the file. Each file stored in the storage device 39 has a separate entry in the cache directory 41. For example, file 1 in the storage device 39 has a category type of "video-on-demand" (VOD); a content ID of "001A"; a genre of "comedy"; a "U" age rating; a movie title of "Movie 1"; a format of "HD (High Definition) 720 p and a size of 1 GB.

The neighbour network store 53 contains a list of the WLANs which intersect with the WLAN of the first wireless router 1 and are therefore accessible to the first wireless router 1. The neighbour network store 53 also stores each neighbouring networks' cache directory and predicted idle periods.

The local policy manager 41 uses the information in the user information store 47, the cache directory 51 and the router information store 49 to determine whether to store new content in the storage device 39 and if so, when to transfer the content. The determined results of the local policy manager are stored in the schedule 55. The schedule contains entries of scheduled actions, for example a first entry relates to a file download scheduled to occur between 0100 and 0130 from the second wireless router 3 and a second entry relates to a file transfer scheduled to occur between 0130 and 0200 from the first wireless router 1 to the third wireless router 5. The scheduler also includes a list of free unscheduled slots.

Wireless Discovery

Figure 4:
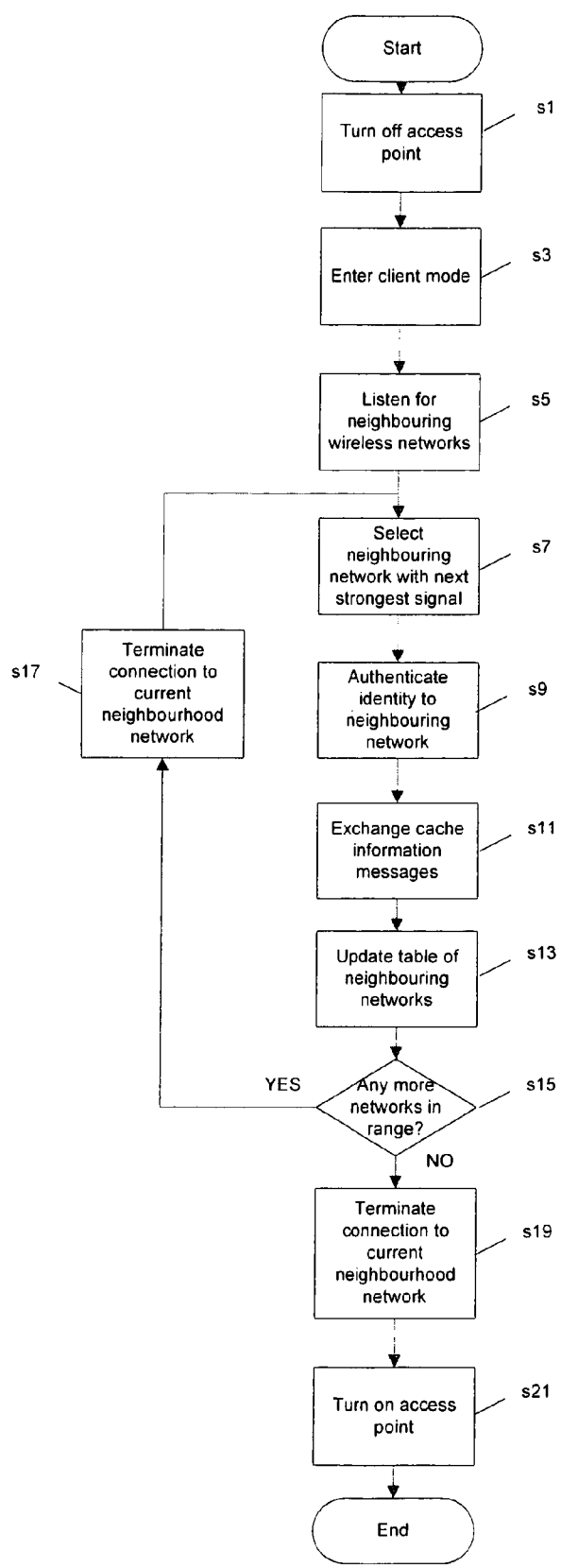
FIG. 4 is a flowchart showing the processing of a local policy manager illustrated in FIG. 2 during wireless discovery.

In order to exchange content with other wireless routers, the first wireless router 1 must perform a discovery process to determine the identity of its neighbours. FIG. 4 is a flow chart showing the processing of the local policy manager 41 during the wireless discovery process. At step s1 the first wireless router 1 turns off its access point thereby disabling its WLAN and in step s3 enters wireless client mode. At step s5 the first wireless router listens for WLANs and creates a list of any detected neighbouring WLANs, this list is stored in the neighbour network store 53 of working memory 43. For example, WLANs 25 and 27 associated with the second wireless router 3 and third wireless router 5 would be detected by the first wireless router 1.

Figure 5:
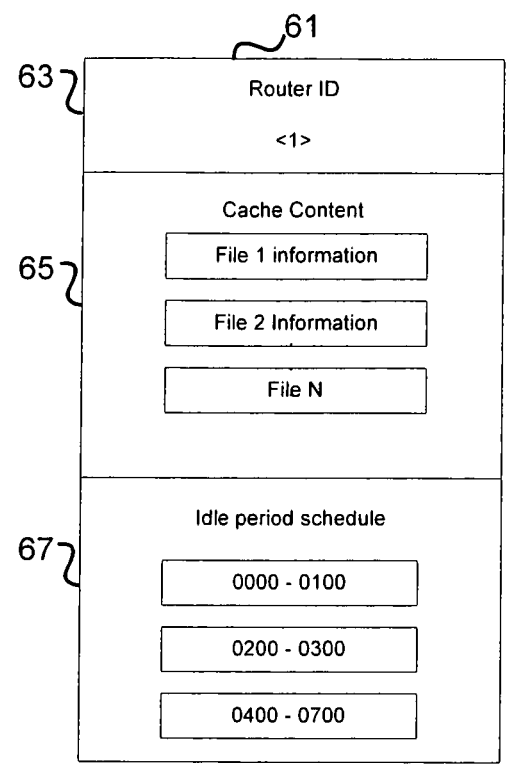
FIG. 5 schematically shows the structure of a cache content message send by the local policy manager illustrated in FIG. 2.

Once the first wireless router 1 has detected and stored a list of neighbouring networks, at step s7 the first wireless router ranks the detected WLANs according to RSSI signal strength and selects the strongest WLAN, for example WLAN 25 associated with the second wireless router 3. At step s9 the first wireless router 1 then sends a request to register with the selected WLAN using public key authentication so that first wireless router 1 becomes a client of the neighbouring WLAN. Once authenticated, the first wireless router exchanges cache information messages at step s11. FIG. 5 shows the format of a cache content message 61 which includes the wireless router ID 63, cache content information 65 and a list of the wireless router's idle periods 67. The local policy manager 41 takes information from the cache directory 51 and the router information store 51 to populate the fields of the cache content message 61.

Having exchanged cache content messages 61, the wireless router 1 updates the information in the neighbour network store 53.

At step s15, if there are more detected neighbouring WLANs the wireless router terminates the connection to the strongest network at step s17 and then repeats steps s7 to s13 for the next strongest detected neighbouring WLAN.

If it is determined at step s15 that there are no further detected neighbouring WLANs, the first wireless router 1 terminates the connection to the current WLAN at step s19 and having received information for all detected neighbouring WLANs restarts its own access point and WLAN 23.

Figure 6:
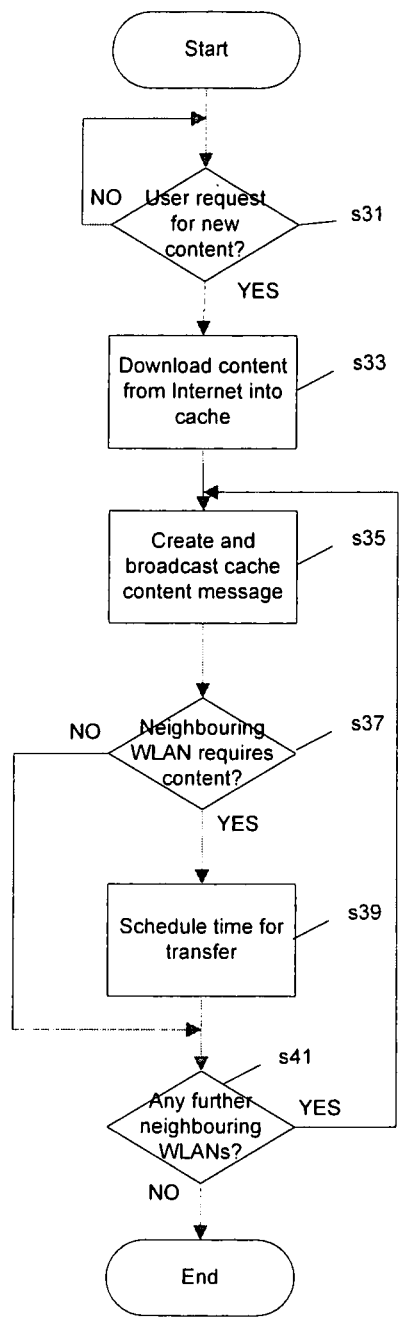
FIG. 6 is flowchart showing the processing on the local policy manager in a first mode.

In the first embodiment the wireless discovery routine is performed at start up, whenever new content is added to the cache, and also once a day to update the neighbour network store 53 as will be described below.
Cache Population The local policy manager of the first wireless router 1 has several modes of operation to populate the cache storage device 39.
First Mode In the first mode, the local policy manager 41 monitors the network traffic of its client machines 11, 13 to selectively cache content into the cache storage device 39. FIG. 6 is a flowchart of this first mode of populating the cache. In this embodiment, the local policy manager 41 detects at step s31 when a client machine 11, 13 has requested video-on-demand content such as a movie and at step s33 caches the requested content into the cache storage device 39 as it is being downloaded by the user.

At step s35, the local policy manager 41 composes a content message 61 describing the cache contents, including the new content, and a list of free time slots for cache transfer. The local policy manager 41 sends the message to neighbouring wireless routers listed in the neighbour network store 53. The local policy manager 41 then connects to the wireless routers of neighbouring WLANs in the same manner described above during the wireless discovery process. The first wireless router 1 disables its own WLAN by switching off its access point and connects as a client to the second wireless router 3 in order to send the new content message 61. The local policy manager 41 waits at step s37 for a response from the second wireless router 3 and if the second wireless router 3 responds with a request for the new content, at step s39 the local policy manager schedules a time for transfer of the content having regard to the free time slot information of both wireless routers.

Once a time has been scheduled, or if the second wireless router does not require the new content, at step s41 the local policy manager determines whether there are any more WLANs listed in the neighbour network store 53, for example the third wireless router 5 and repeats steps s35 to s41. The process is repeated until the new content message 61 has been delivered to all of the neighbouring WLANs and times have been scheduled for delivery of the content if required.

The processing performed by a recipient of the above new cache content message 61 will now be described. For example, when the second wireless router 3 receives a new cache content message from the first wireless router 1, the local policy manager 41 of the second wireless router 3 extracts the cache content and compares the extracted cache content with the stored user information to determine whether any its users would be interested in the new content. If so, the second wireless router 3 responds with a list of free time slots which are available for receiving the content. Otherwise it sends a message indicating that it is not interested in the new cache content. For example, if the user information store indicates that users have previously downloaded horror movies, and a new cache content message 61 is received including information describing a new horror movie, the second wireless router 3 will respond with a list of free times. On the other hand, if the user information store indicates that the users have downloaded children's films, then the second wireless router 3 will respond with a message indicating that it does not want the new content.

The local policy manager schedules content transfer between wireless routers by identifying common idle time periods between each wireless router. In particular, the local policy manager estimates the period of time required to transfer the content using the file size information associated with the content and the maximum bandwidth of the WLAN. For example, theoretically an 8 GB file will take approximately 20 minutes to be transferred over a WLAN having a maximum bandwidth of 54 Mbs. However, since this maximum bandwidth is rarely achieved, the local policy manager will estimate that the transfer will require an hour. Using this estimated transfer time, the local policy manager identifies the earliest common idle time period which provides sufficient time for the content transfer to complete. The local policy manager updates the schedule stored in the working memory and sends a message to the other wireless router so that its schedule is also updated.

At the scheduled time, the wireless router which is to receive the content disables its WLAN and becomes a client of the wireless router having the content and the sending wireless router transmits the content to the cache storage device of the receiving wireless router. Once the content transfer is complete, the local policy manager of each wireless router removes the entry from the schedule.

Figures 7A, 7B:
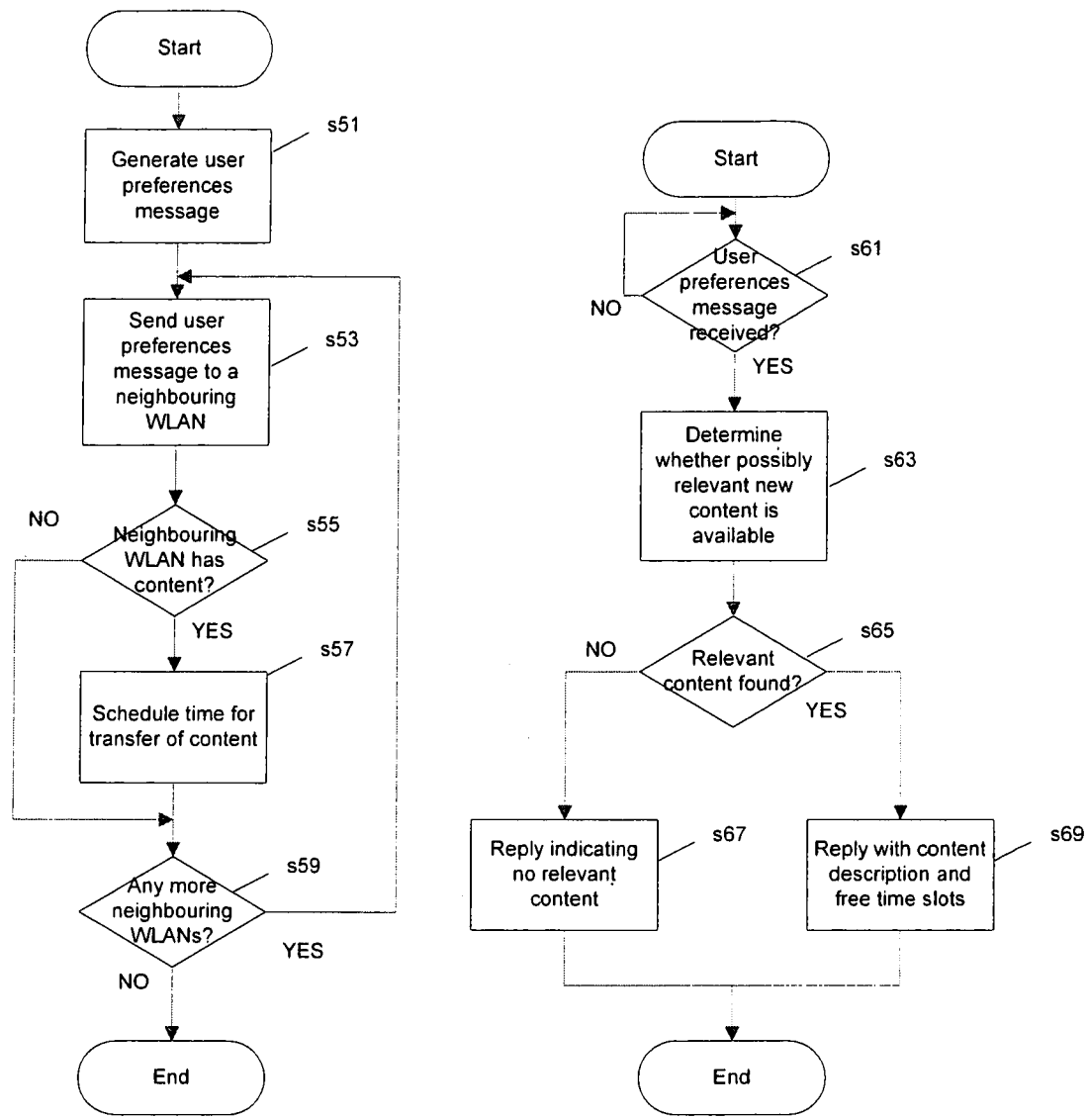
FIG. 7a is a flowchart showing the processing of the local policy manager of a first wireless router in a second mode.
FIG. 7b is a flowchart showing the processing of the local policy manager of a second wireless router in a second mode.

In a case where either router is not available to perform the content transfer at the scheduled time, the local policy managers can re-schedule the transfer by determining the next common idle time slot which provides sufficient time for the content transfer to complete.
Second Mode In a second mode, the local policy manager pre-fetches content for its users based on the users' preference information and download history. FIGS. 7a and 7b show flowcharts of the second mode of populating the cache.

In FIG. 7a, at step s51, the local policy manager of the first wireless router 1 periodically composes a user preferences message based on the preference data and download history information contained in the user information store 47. At step s53 the first wireless router 1 disables its WLAN and connects to a neighbouring network listed in the neighbour network store 53, for example the second wireless router 3, in the manner described above with reference to the wireless discovery process. The local policy manager sends the composed message to the second wireless router 3 and waits for a response at step s55. If the second wireless router 3 responds with an indication that it has relevant content for pre-fetching, at step s57 the local policy manager schedules a time for transfer of the content and updates the schedule in the same manner as set out above.

The local policy manager 41 then determines from the neighbour network store 53 whether there are any further reachable WLANs, for example the WLAN of the third wireless router 5, and if so, repeats steps s53 to 59. If there are no further WLANs, the process ends.

FIG. 7b shows a flowchart of the processing of the second wireless router 3 when the first wireless router sends a user preferences message. If at step s61 a user preferences message is received from the first wireless router 1, then at step s63 the local policy manager of the second wireless router 3 determines whether its cache storage device 39 contains any relevant content by comparing the received user preferences message with the cache description information stored in the cache directory 51. If it is determined at step s65 that the cache contains no relevant content then at step s67 the local policy manager of the second wireless router sends a message to the first wireless router indicating that it does not have relevant content and the process terminates. If however the cache storage device 51 does contain relevant material, then at step s69 the local policy manager of the second wireless router 3 sends a message to the first wireless router containing a description of the content and free time slots for transferring the content.

The local policy manager 41 of the first wireless router then schedules a time for transfer in the same manner as described in the first mode.

If, at a later time the user requests content which has already been pre-fetched by the wireless router, then the content is transferred directly from the cache storage device and the request to the content provider is dropped.

Third Mode

When a user makes a request for new content, the local policy manager 41 of the first wireless router 1 checks its cache storage device 39 for the requested content and if the requested content is available, transfers the data to the requesting user.

If the requested content is not available, the first wireless router communicates with each of its neighbouring wireless routers to determine whether the requested content is available via one of the neighbouring wireless routers and if so schedules transfer of the content to cache before forwarding the content to the user.

If the requested content is not available either directly from the wireless router's cache storage device 39 or from a neighbouring wireless router's cache storage device 39, the wireless router initiates transfer of the requested content from the content server via its ADSL connection to the Internet for storage in its own cache storage device, forwards the content to the requesting user and also broadcasts the presence of new cache content to its neighbouring hubs.

In the third mode, if the first wireless router 1 is already busy downloading content and cannot service the user's request, the local policy manager 41 creates a content download message from the information in the user's request and sends the message to a neighbouring wireless router which is idle, for example the second wireless router 3. The second wireless router 3 downloads the content using its own ADSL connection and once complete schedules transfer of the new content to the first wireless router 1.

Where the user has requested content having a particularly large size a single ADSL connection is a significant bottle neck. To alleviate this problem, the local policy manager splits the content into several parts and downloads only a part of the content. The local policy manager also requests its neighbouring wireless routers to download different parts of the content. For example in the system of FIG. 1, the first, second and third wireless routers would each download three different parts of the requested content using their ADSL connections such that the complete content can be reassembled by the first wireless router.

Figure 8:
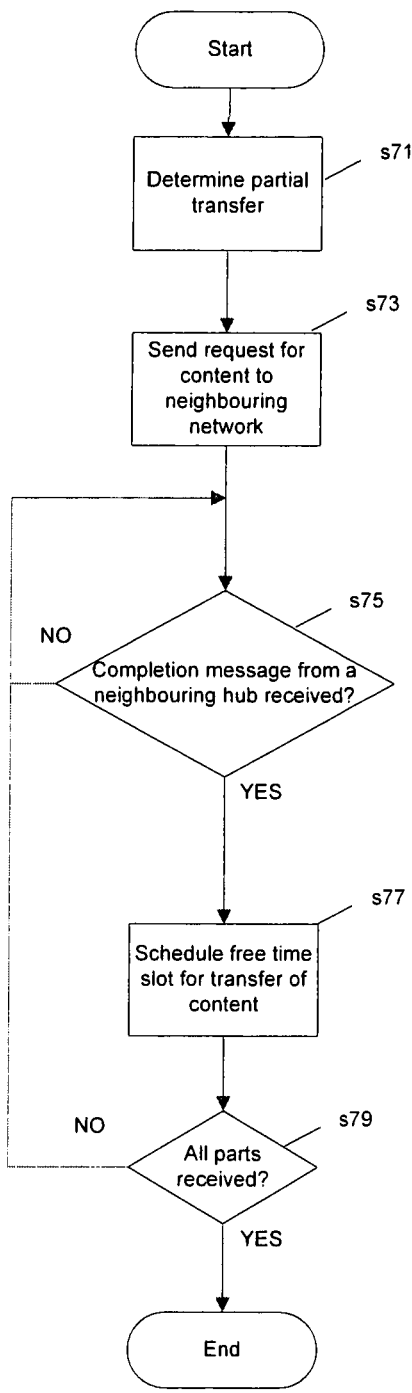
FIG. 8 is a flowchart showing the processing of the local policy manager in a third mode.

FIG. 8 shows a flowchart of the third mode of operation where a user of the first wireless router 1 has requested new content. Once a request for large content has been received and the local policy manager has already determined that the content is not available in either its own cache storage device or a neighbouring wireless router's cache storage device, at step s71 the local policy manager 41 determines how to split the content download having regard to the maximum download speed and predicted idle time of the ADSL connections of each neighbouring wireless router. For example, if the ADSL connections of the first and third wireless routers each has a maximum download speed of 20 Mb/s and the second wireless router has a maximum download speed of 5 Mb/s, the local policy manager will split the content such that the first and third wireless routers have a greater proportion of the content to download that the second wireless router. In other cases, where the wireless routers all have similar maximum download speeds, the content would be split equally.

Having determined how to split the content, at step s73, the first wireless router 1 disables its WLAN and connects as a client to each of its neighbour WLANs in order to send a respective message indicating the part of the content desired.

At step s75 the local policy manager of the first wireless router 1 waits for a completion message to be received from the second or third wireless router. Once a completion message is received, at step s77 the local policy manager schedules a free time slot for transfer of the content and updates the schedule in working memory 43.

At step s79, if all parts have not yet been received, the local policy manager repeats steps s75 to s77 until all parts have been received and the first wireless router has cached the requested content.

In the third mode, the second and third wireless routers are downloading content on behalf of the first wireless router and therefore an appropriate charging system must be implemented to ensure that costs associated with the downloads are redirected to the wireless router which issued the content request. However this charging system is beyond the scope of this application and will not be described.

High Definition content transferred between the wireless routers will typically be encrypted to comply with Digital Rights Management issues. Therefore users wishing to view content received from a neighbouring WLAN will need to obtain suitable licensing/decryption keys. However, the size of such keys is very small in comparison with the size of the cached content.

Summary of First Embodiment

In the first embodiment, a system is described in which wireless routers providing users with a shared ADSL connection have local storage for caching video-on-demand content. Furthermore, where the wireless routers have intersecting WLANs, content can be exchanged between each wireless router. This is advantageous to users because content can be delivered via the wireless network more quickly than via an ADSL connection. Also, downloading content from another hub does not saturate the wireless router's ADSL connection meaning that the user can continue other tasks.

The system described in the first embodiment also reduces the volume of data transferred over the wireless router's ADSL connection. This is particularly advantageous where the user has a "capped service", i.e. a broadband internet service which places limits on the total amount of data a user can download/upload every month. In the above system, video-on-demand content is transferred over the wireless network and does not contribute to the user's data transfer allowance.

Second Embodiment

In the first embodiment, the wireless routers can exchange video-on-demand content via their wireless networks so that users can obtain such content without downloading data over their ADSL connections. In order to coordinate such data exchange, the wireless routers exchange messages between one another to discover neighbours, broadcast the presence of new cache content and or user preferences.

However, for two wireless routers to communicate, one must disable its own WLAN and become a client on the WLAN of the other wireless router. This process must be repeated for each neighbouring WLAN and can lead to a significant proportion of time spend disabling and enabling WLANs. In the first embodiment, the impact of the message exchange between wireless routers is minimised because all clients were connected via wired Ethernet connections. However, when wireless clients are also present on a wireless router's WLAN, they will lose connectivity each time the wireless router must disable its WLAN.

Figure 9:
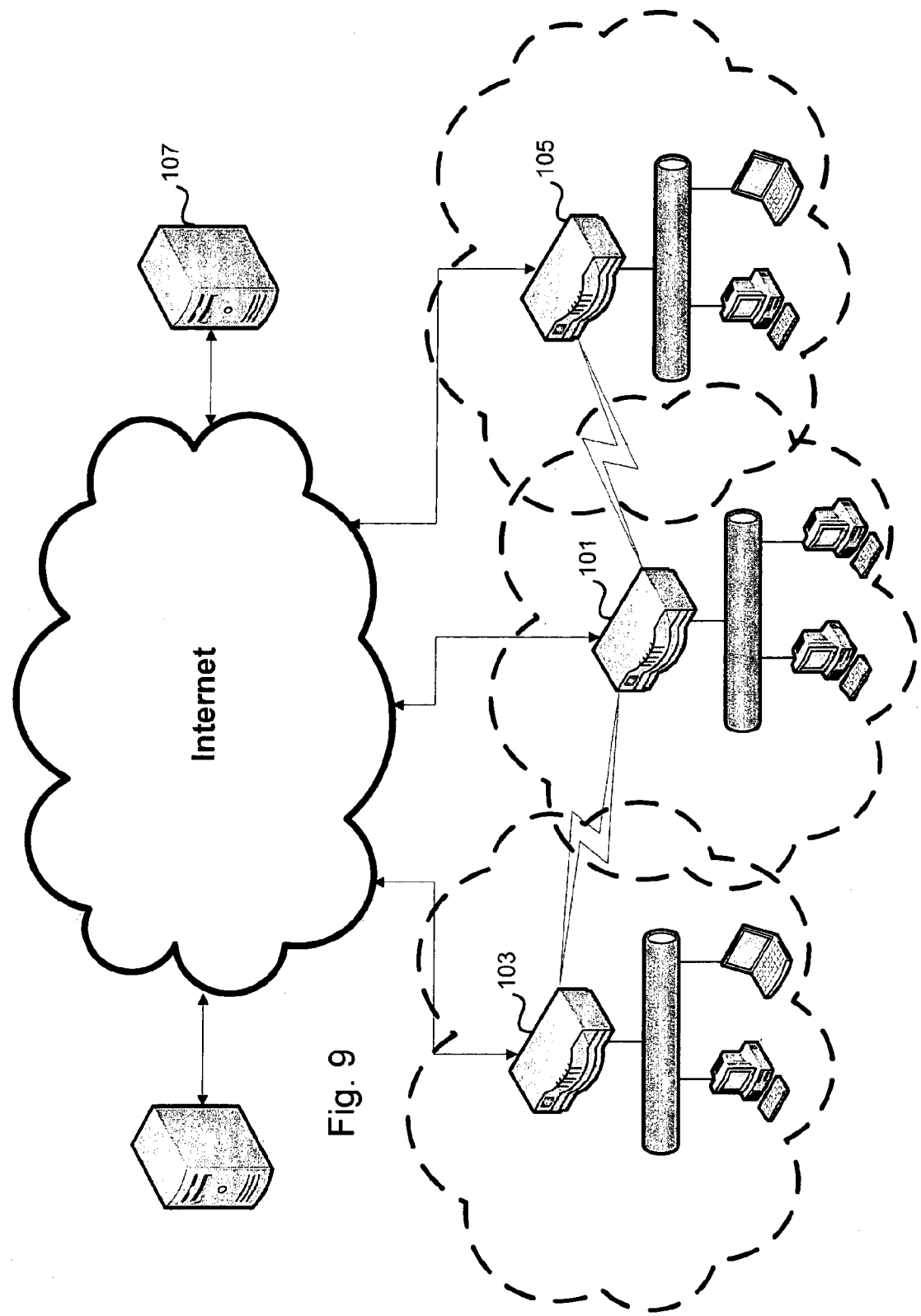
FIG. 9 shows a typical system according to the second embodiment.

FIG. 9 shows a system according to a second embodiment. In this embodiment, the wireless routers 101, 103, 105 still disable their WLANs to transfer content into cache during idle periods, but instead of exchanging messages with each other, they send and receive messages over their ADSL connections to a central server 107. Other features in common with the first embodiment will not be described again. The central server 107 manages and coordinates the transfers of cache content between wireless routers and therefore reduces the processing load on each wireless router, in particular each wireless routers local policy manager, and also reduces the time that each wireless router must disable its WLAN. Each wireless router now only needs to send neighbourhood information, cache content information and user preference information. Scheduling of content transfer is managed by the central server.

In the system of the second embodiment, each wireless router periodically performs wireless discovery in the same manner as in the first embodiment to discover neighbouring networks. The results of the wireless discovery process are also sent to the central server 107 via each wireless router's ADSL connection. The central server 107 analyses the wireless discovery messages received from the wireless routers to build a map of the wireless router topology and in particular the intersections between WLANs of each wireless router.

Figure 10:
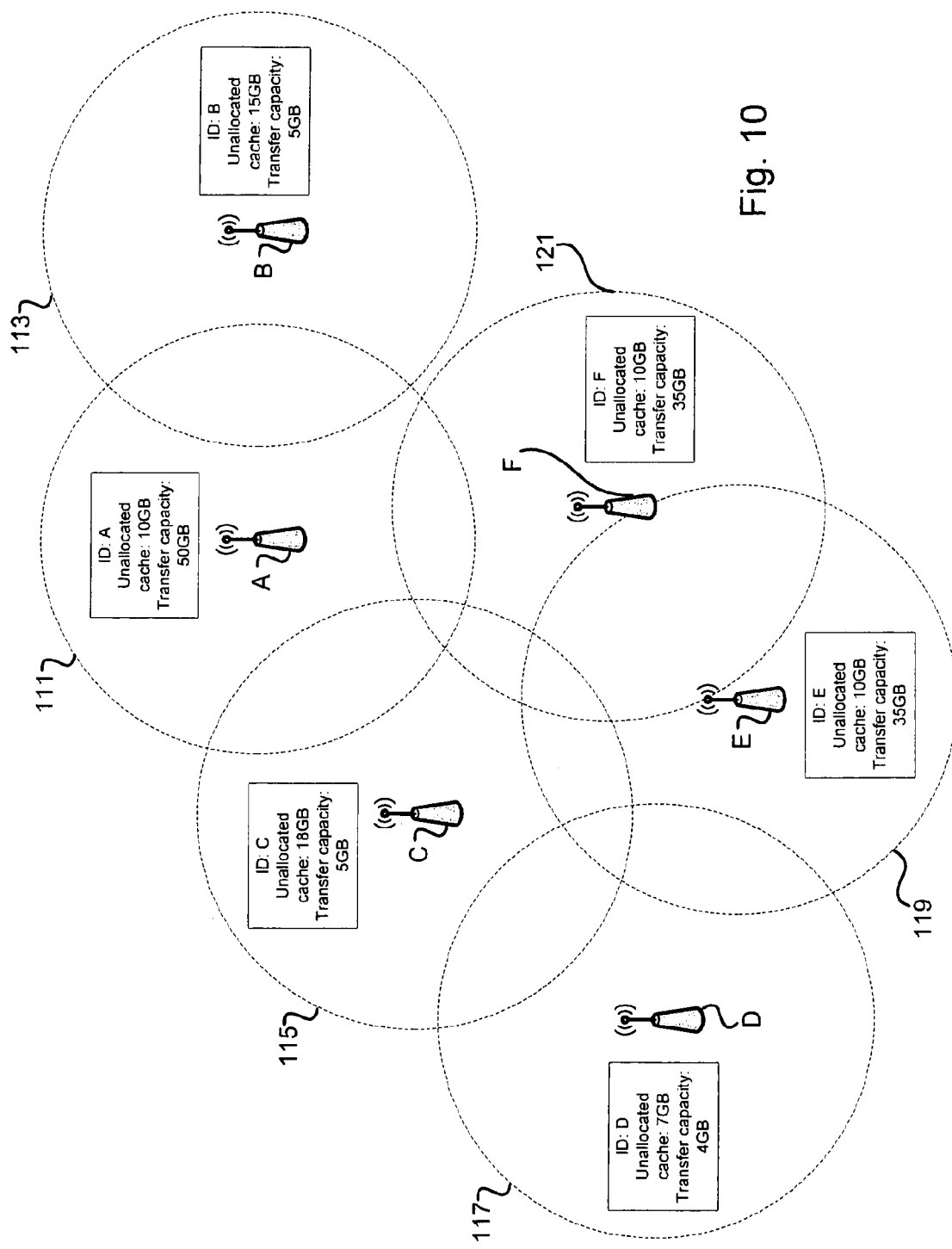
FIG. 10 schematically shows a group wireless routers having intersecting wireless networks.

FIG. 10 schematically shows a number of wireless routers A, B, C, D, E and F having respective WLANs 111, 113, 115, 117, 119, 121 that intersect. The WLAN 111 of wireless router A intersects with the WLANs 113, 115, 121 of wireless routers B, C and F. The WLAN 113 of wireless router B intersects with the WLAN 111 of wireless routers A. The WLAN 115 of wireless router C intersects with the WLANs 111, 117, 119, 121 of wireless routers A, D, E and F. The WLAN 117 of wireless router D intersects with the WLANs 115, 119 of wireless routers C and E. The WLAN 119 of wireless router E intersects with the WLANs 115, 117, 121 of wireless routers C, D and F. The WLAN 121 of wireless router F intersects with the WLANs 111, 115, 119 of wireless routers A, C and E. A topology table 131 created by the central server is shown in FIG. 11. The table 131 has a router ID column 133 listing each wireless router and a direct neighbour column 135 listing each wireless router's neighbours.

Each wireless router sends their wireless discovery information to the central server 107. The central server 107 uses the received wireless discovery information to determine not only direct links between wireless routers, but also indirect links. For the wireless routers shown in FIG. 10, for each wireless router the central server 107 determines the other wireless routers that are reachable using one of the direct links as an intermediary hop. For example, the central server determines that wireless router A can exchange content with wireless router D via wireless router C and that wireless router A can also exchange content with wireless router E via either wireless routers C or F. Wireless router B can exchange content with wireless routers C or F via wireless router A. Wireless router C can exchange content with wireless router B via wireless router A. Wireless router D can exchange content with wireless router A via wireless router C and also wireless router F via wireless router E. Wireless router E can exchange content with wireless router A via either wireless router C or F. Wireless router F can exchange content with wireless router B via wireless router A and also wireless router D via wireless routers C or E. The topology table 131 stores this information in a third column 137.

The advantage of this approach compared to the first embodiment is that the volume of available cache content is increased which as a consequence increases the likelihood that requested content can be provided to a user from cache instead of via the ADSL connection to the Internet.

The centralised server also stores information about the status of each wireless router, for example, the amount of free space unallocated in the cache of each wireless router, the maximum link speed of the wireless connection of each wireless router and the idle time of each wireless router. Using the link speed and idle time, the central server can determine the capacity of each wireless router for transferring data to other wireless routers. This information is used by the central server to determine preferred paths for transferring cache content.

FIG. 10 also shows the status of each wireless router. Wireless router A has 10 GB available for storing new cache content and has a transfer capacity of 50 GB. Wireless router B has 15 GB available for storing new cache content and has a transfer capacity of 5 GB. Wireless router C has 18 GB available for storing new cache content and has a transfer capacity of 5 GB. Wireless router D has 7 GB available for storing new cache content and has a transfer capacity of 4 GB. Wireless router E has 10 GB available for storing new cache content, and has a transfer capacity of 35 GB. Wireless router F has 10 GB available for storing new cache content and has a transfer capacity of 35 GB.

As described above, more than one path may exist between two indirectly linked routers. For example, if a user of wireless router A requests content which is not available in the caches of its direct neighbouring wireless routers B, C or F, but is stored in the cache of wireless router E, then the content can be transferred from wireless router E to wireless router A via wireless routers C or F. The central server 107 determines that wireless router F has a greater transfer capacity that that of wireless router E and therefore decides to transfer the content from wireless router E to wireless router A via wireless router F.

The central server 107 schedules delivery of the content from wireless router E to wireless router A via wireless router F using information idle time information provided by each router and the sends a scheduling message to each wireless router in the path. The scheduled time for transferring content from wireless router E to wireless router F is sufficiently earlier than the scheduled time for transferring the content from wireless router F to wireless router A. If the transfer from wireless router E to wireless router F has not completed before the scheduled time for transferring content from wireless router F to wireless router A, then the later transferred is rescheduled.

In the second embodiment, wireless routers exchange messages with a central server. The central server determines direct and indirect links between the wireless routers to increase the volume of cache content and the likelihood of requested content being available via cache.

Alternatives and Modifications

In the above embodiments, the users of each wireless router are connected to the wireless router using wired links while the wireless link of the wireless router is reserved for content transfer. In an alternative, some or all of the users are wirelessly connected to the wireless router. However, this arrangement has the disadvantage that users will lose connectivity when the wireless router needs to turn off its access point in order to exchange messages or content with other wireless routers. Users will also experience reduced bandwidth when a neighbouring wireless router has become a client of the wireless router and is sending data.

To overcome the above problems, in a further alternative, each wireless router has a second wireless access point function operating on a different frequency. For example, if the first wireless controller is a 802.11g controller, the further wireless controller is a 802.11a controller or vice versa. With such a function, one of the wireless controllers provides an access point for the client machines of users, whilst the other wireless controller is exclusively used for communication with other wireless controllers.

In the first embodiment, each wireless router only stores information regarding its immediate neighbours. Therefore each wireless router can only exchange content with these directly identified neighbours. In contrast, the central server of the second embodiment stores a complete topology of the wireless routers network and can coordinate exchange of content between wireless routers which are not directly connected. In an alternative, each wireless router periodically exchanges neighbour network information with other wireless routers to determine indirect paths to other wireless routers.

In the first embodiment, during each of the three modes of operation, any requests or message broadcasts are forwarded only forwarded to the direct neighbours, and each message can be regarded as having a time-to-live of "one". In the alternative, each message has a higher value TTL so that requests and broadcasts can propagate for several hops.

In the embodiments, the operation of the local policy manager and the cache storage device is transparent to the user. In an alternative the user is aware of the caching ability of the wireless router and can request scheduled downloads and indicate the relative priority of requests for content.

Similarly, in the embodiments, in the pre-fetch mode of the local policy manager, content is pre-fetched but to maintain the transparent operation of the wireless router, the user is not notified of the pre-fetched content. In an alternative, once content has been transferred to a receiving wireless router at the scheduled or re-scheduled time, the local policy manager provides users with a list of newly available content in the cache and the user has the option to view the new content if desired.

In the above embodiments, the wireless routers have ADSL controllers to connect to the Internet. In an alternative the wireless routers have cable/Ethernet controllers to connect to the Internet.

The invention claimed is:

1. A method of operating a first wireless router to process a request issued by a connected client device for an item of multimedia content data available from a remote multimedia content provider, said first wireless router being connected to said remote multimedia content provider via a wide area network data link, and having a wireless interface for generating a first wireless network, said first wireless network intersecting with a second wireless network created by a second wireless router, said second wireless router having a data store containing said item of multimedia content data, the method comprising:
   intercepting the request issued by the connected client device;
   determining whether said requested item of content data is available in a data store of the first wireless router;
   if the requested item of content data is available in the data store of the first wireless router, transferring the requested item of content data to the connected client device;
   if the requested item of content data is not available in the data store of the first wireless router:
      connecting to said second wireless network of the second wireless router as a client device via the wireless interface;
      determining whether said requested item of content data is available on the data store of said second wireless router; and
      transferring the requested item of content data stored in said data store of the second wireless router via the second wireless network to the data store of the first wireless router if a determination is made that said requested item of content data is available on the data store of said second wireless router; and
   transferring the requested item of content data from the data store of the first wireless router to the connected client device.

2. A method according to claim 1, further comprising pre-emtively transferring further items of multimedia content data to the data store of the first wireless router-prior to a request for those items of multimedia content data being issued by the connected client device.

3. A method according to claim 1, wherein said determining whether the requested item of content data is available on the data store of the second wireless router comprises:
   receiving a content listing message from the second wireless router; and
   searching the received content listing message for said item of multimedia content data.

4. A method according to claim 1, wherein said first wireless network also intersects with a third wireless network created by a third wireless router having a data store containing said requested item of multimedia content data; and said requested item of multimedia content data is also transferred from said third wireless router.

5. A method according to claim 1, further comprising scheduling the transfer of the requested item of multimedia content data from the second wireless router to the first wireless router in accordance with predicted idle times of the first and second wireless routers.

6. A method according to a claim 2, wherein the requested item of multimedia content data is transferred to the first wireless router in response to a match between user preference information stored on the first wireless router and the content listing message sent from the second wireless router.

7. A method according to claim 5, wherein said scheduling comprises message exchange between the first wireless router and the second wireless router.

8. A method according to claim 5, wherein the scheduling is managed by a central server.

9. A method according to claim 1, further comprising performing a wireless discovery process to determine the presence of the second wireless network.

10. A method according to claim 1 wherein said determining whether the requested item of multimedia content data is available on the data store of the second wireless router comprises:
   connecting to a central server storing a directory of multimedia content items stored in the second wireless router; and
   searching the directory for said requested item of multimedia content data.

11. A wireless router for processing a request issued by a connected client device for an item of multimedia content data available from a remote multimedia content provider, the wireless router comprising:
   a wide area network data link interface operable to connect to the remote multimedia content provider;
   a wireless network interface for generating a first wireless network, said first wireless network intersecting with a second wireless network created by a second wireless router having a data store containing said requested item of multimedia content data;
   a local data store; and
   a processing system, comprising a computer processor, configured to:
      intercept the request issued by the connected client device;
      determine whether said requested item of content data is available in the local data store of the wireless router;
      transfer the requested item of content data to the connected client device if the requested item of content data is in the local data store; and
      if the requested item of content data is not available in the local data store:
         instruct the wireless network interlace to connect to said second wireless network of the second wireless router as a client device;
         determine whether said requested item of multimedia content data is available on the data store of said second wireless router; and
         transfer the requested item of multimedia content data stored in the data store of the second wireless router via the second wireless network to the local data store of the wireless router if a determination is made that said requested item of multimedia content data is available on the data store of said second wireless router; and
         transfer the requested item of data from the local data store of the wireless router to the connected client device.

12. The wireless router according to claim 11, wherein the processing system is further operable to pre-emptively transfer further items of multimedia content data to the local data store prior to a request for the item of multimedia content data being issued by the connected client device.

13. The wireless router according to claim 11, wherein in order to determine whether the item of multimedia content data is available on the data store of the second wireless router, the processing system is further configured to:
   receive a content listing message from the second wireless router; and
   search the received content listing message for said item of multimedia content data.

14. The wireless router according to claim 11, wherein the processing system is further configured to schedule the transfer of the item of multimedia content data from the second wireless router to the wireless router in accordance with predicted idle times of the wireless router and the second wireless router.

15. The wireless router according to claim 13, wherein the item of multimedia content data is transferred to the wireless router in response to a match between user preference information stored on the wireless router and content listing message sent from the second wireless router.

16. A non-transitory computer-readable storage medium tangibly storing instructions which upon execution by a computer system provides functionality for operating a first wireless router to process a request issued by a connected client device for an item of multimedia content data available from a remote multimedia content provider, said first wireless router being connected to said remote multimedia content provider via a wide area network data link, and having a wireless interface for generating a first wireless network, said first wireless network intersecting with a second wireless network created by a second wireless router, said second wireless router having a data store containing said item of multimedia content data, the functionality comprising:
   intercepting the request issued by the connected client device;
   determining whether said requested item of content data is available in a data store of the first wireless router;
   if the requested item of content data is available in the data store of the first wireless router, transferring the requested item of content data to the connected client device;
   if the requested item of content data is not available in the data store of the first wireless router:
      connecting to said second wireless network of the second wireless router as a client device via the wireless interface;
      determining, whether said requested item of content data is available on the data store of said second wireless router; and
      transferring the requested item of content data stored in said data store of the second wireless router via the second wireless network to the data store of the first wireless router if a determination is made that said requested item of content data is available on the data store of said second wireless router; and
   transferring the requested item of content data from the data store of the first wireless router to the connected client device.

17. The non-transitory computer-readable storage medium of claim 16, wherein further items of multimedia content data are pre-emptively transferred to the data store of the first wireless router prior to receiving further requests for items of multimedia content data.

18. The non-transitory computer-readable storage medium of claim 16, wherein said determining whether the requested item of content data is available on the data store of the second wireless router comprises:
receiving a content listing message from the second wireless router; and
searching the received content listing message for said requested item of multimedia content data.

19. The non-transitory computer-readable storage medium of claim 16, wherein:
said first wireless network also intersects a third wireless network created by a third wireless router having a data store containing said requested item of multimedia content data; and
said requested item of multimedia content data is also transferred from said third wireless router.

20. The non-transitory computer-readable storage medium of claim 16, further comprising scheduling the transfer of the requested item of multimedia content data from the second wireless router to the first wireless router in accordance with predicted idle times of the first and second wireless routers.

21. The non-transitory computer-readable storage medium of claim 19, wherein the requested item of multimedia content data is transferred to the first wireless router in response to a match between user preference information stored on the first wireless router and the content listing message sent from the second wireless router.

22. The non-transitory computer-readable storage medium of claim 16, wherein said determining whether the requested item of multimedia content data is available on the data store of the second wireless router comprises:
connecting to a central server storing a directory of content items stored in the second wireless router; and
searching the directory for said requested item of multimedia content data.

\* \* \* \* \*